United States Patent
Williams (10) Patent No.: US 9,849,998 B2
(45) Date of Patent: Dec. 26, 2017

(54) BLOCK FOAM METHOD OF ACCOMPLISHING IGNITION MITIGATION IN AIRCRAFT FUEL TANKS

(71) Applicant: Michael D Williams, Fayetteville, GA (US)

(72) Inventor: Michael D Williams, Fayetteville, GA (US)

( * ) Notice: Subject to any disclaimer, the term of this patent is extended or adjusted under 35 U.S.C. 154(b) by 241 days.

(21) Appl. No.: 14/851,511

(22) Filed: Sep. 11, 2015

(65) Prior Publication Data

US 2017/0073079 A1    Mar. 16, 2017

(51) Int. Cl.
*B64D 37/08* (2006.01)
*B64D 37/32* (2006.01)
*B64D 37/02* (2006.01)
*B60K 15/03* (2006.01)

(52) U.S. Cl.
CPC .............. *B64D 37/32* (2013.01); *B64D 37/02* (2013.01); *B60K 2015/03032* (2013.01); *B60K 2015/03039* (2013.01); *B64D 37/08* (2013.01)

(58) Field of Classification Search
CPC ..... B23P 2700/01; B64D 37/02; B64D 37/08; B64D 37/32; A62C 2/06; A62C 3/08; B60K 2015/03032; B60K 2015/03039; B60K 2015/0344; B60K 2015/03407; B60K 2015/03421; B60K 15/03006; B60K 15/03
USPC .................................... 244/135 R; 511/135 R
See application file for complete search history.

(56) References Cited

U.S. PATENT DOCUMENTS

| | | | |
|---|---|---|---|
| 6,358,591 B1 | 3/2002 | Smith | |
| H2054 H | 12/2002 | Bennet | |
| 6,803,090 B2 | 10/2004 | Castiglione et al. | |
| 7,341,113 B2 | 3/2008 | Fallis et al. | |
| 2011/0272526 A1* | 11/2011 | Barbosa | B64C 17/10 244/135 A |
| 2014/0076285 A1 | 3/2014 | Marin et al. | |
| 2014/0216416 A1 | 8/2014 | Novaco et al. | |
| 2017/0096234 A1* | 4/2017 | Martindale | B64D 37/06 |

FOREIGN PATENT DOCUMENTS

WO    WO 2015/170088 A1 *   5/2015   ............. B60K 15/03

* cited by examiner

*Primary Examiner* — Christopher Besler
(74) *Attorney, Agent, or Firm* — J. T. Hollin, Attorney-at-Law, P.C.

(57) ABSTRACT

A process method utilizing customized, specifically-shaped pieces of reticulated polyurethane foam (RPF) to fill an aircraft fuel tank or tank compartment to provide ignition mitigation and prevent explosion in the tank. The process involves inserting the shaped pieces of RPF through existing access ports into a fuel tank in order to fill the tank, excepting minimal planned void spaces. This process effects ignition mitigation by acting as an ignition blocker, mechanically interfering with the compression wave that precedes the flame front in an explosion, and changing the vaporous mixture above the fuel level (ullage) in the tank. The foam pieces are assembled and fitted together throughout the tank in a pattern that replicates the shape of the tank. After the foam insertion is complete, the fuel tank is filled with purging fluid, drained through a filter until no debris is found, and the new maximum fuel quantity is recalibrated.

6 Claims, 7 Drawing Sheets

BLOCK FOAM METHOD OF ACCOMPLISHING IGNITION MITIGATION IN AIRCRAFT FUEL TANKS

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

1. Field of the Invention

The inventive concept disclosed relates generally to methods employed to prevent and/or minimize fuel ignition, fire, and/or explosion in the interior of aircraft fuel tanks. In particular, the inventive concept disclosed is concerned with specific methods of installing shaped, reticulated sheets or blocks, of foam to fill the internal space of fuel tanks of transport category aircraft.

2. Background

Since 1959, there have been sixteen documented incidents of fuel tank ignition events in aircraft. These fuel tank ignition events have resulted in 542 fatalities, 11 hull losses and 3 incidents causing substantial damage. The causes of the fuel tank ignition events were attributed as follows: 4 were caused by external wing fires, 4 by electrostatics, 3 by faulty fuel pumps or wiring, 2 by lightning, and 3 to unknown causes.

On Jul. 17, 1996, TWA Flight 800 sustained an in-flight break-up after taking off from Kennedy International Airport in New York, resulting in 230 fatalities. The National Transportation Safety Board ("NTSB") conducted a lengthy investigation and determined that ignition of the flammable fuel/air mixture in a center wing fuel tank had occurred, causing an explosion that disintegrated the aircraft in flight. Although the exact ignition source could not be determined, the NTSB concluded that the most likely ignition source was a short circuit outside the center wing fuel tank that allowed excessive voltage to enter the tank through electrical wiring associated with the fuel quantity indication system (FQIS).

The NTSB announced their official findings regarding the TWA 800 accident at a public meeting held on Aug. 22 and 23, 2000 in Washington. D.C. Primarily as a consequence of TWA Flight 800, the Federal Aviation Administration ("FAA") issued numerous airworthiness directives intended to reduce possible ignition sources and thereby the risk of another fuel tank explosion. On May 7, 2001, the FAA promulgated rulemaking to establish several new transport category airplane fuel tank safety requirements (66 Federal Registry 23086, May 7, 2001). The rulemaking, effective Jun. 6, 2001, included Amendment 21-78, Amendment 25-102 and Special Federal Aviation Regulation ("SFAR") No. 88 entitled "Transport Airplane Fuel Tank System Design Review. Flammability Reduction and Maintenance Requirements." SFAR No. 88 required that type certificate holders and supplemental type certificate holders conduct a revalidation of the fuel tank system designs on the existing fleet of transport category airplanes capable of carrying thirty (30) or more passengers or a payload of 7,500 pounds or more.

Legislation was enacted as 14 CFR §25.981 (Rule 25.981) and FAA Advisory Circulars AC 25.981-1B and 25.981-2 were issued to provide compliance guidance. Compliance with Rule 25.981 required each applicant to develop a failure analysis for the fuel tank installation to substantiate that ignition sources would not be present in the fuel tanks. The requirements of this section are in addition to the more general propulsion failure analyses requirements of 14 CFR 25.901 and 14 CFR 25.1309 that have been applied to propulsion installations.

14 CFR §25.981 (a) (3) defines three failure scenarios that must be addressed in order to show compliance with the rule (known as the "three phases" of compliance):

(a) Each single failure, regardless of the probability of occurrence of the failure, must not cause an ignition source;

(b) Each single failure, regardless of the probability of occurrence, in combination with any latent failure condition not shown to be at least extremely remote (i.e., not shown to be extremely remote or extremely improbable), must not cause an ignition source; and (c) All combinations of failures not shown to be extremely improbable must not cause an ignition source.

Compliance with 14 CFR §25.981 (Amendment 25-125) requires investigation of the airplane fuel tank system using analytical methodology and documentation currently used by the aviation industry to demonstrate compliance with 14 CFR 25.901 and 25.1309 but with consideration of unique requirements included in this amendment of this paragraph.

The Federal Aviation Administration (FAA) mandates forced certificate holders to develop and implement all design changes required to demonstrate that their aircraft meet the new ignition prevention requirements and to develop fuel tank maintenance and inspection instructions. Specifically, SFAR No. 88 contains six (6) requirements applicable to transport category aircraft: 1) determine the highest temperature allowed before ignition occurs; 2) demonstrate that this temperature is not achieved anywhere on the aircraft where ignition is possible; 3) demonstrate that ignition could not occur as a result of any single point failure; 4) Establish Critical Design Configuration Control Limitations ("CDCCL"), inspections or other procedures to prevent changes to the aircraft that would result in re-introduction or creation of ignition sources; 5) develop visible means to identify critical features of the aircraft where maintenance, repairs or alterations would affect areas or systems of possible ignition; and 6) design of fuel tanks must contain a means to minimize development of flammable vapors in fuel tanks or a means to mitigate the effects of ignition within fuel tanks.

Maintenance of ignition source prevention features is necessary for the continued operational safety of an airplane's fuel tank system. One of the primary functions of the fuel tank system is to deliver fuel in a safe manner. Preventing ignition sources is as important a function of the fuel system as the delivery and gauging of fuel. The failure of any ignition source prevention feature may not immediately result in an ignition event, but a failure warrants maintenance for continued airworthiness because the failure could eventually have a direct adverse effect on operational safety.

There have been various solutions proposed and implemented to comply with the mandated transport category aircraft fuel tank ignition mitigation requirements. Examples of compliance methods implemented include electronic solutions such as the installation of Transient Suppression Devices ("TSD"), Ground Fault Interrupters ("GFI"), and similar current limiting devices. These devices are deficient in that they retain possible failure rates that a "passive," non-electronic solution could resolve. Clearly, there is a need for a simplified and reliable solution to make implementation of the SFAR No. 88 compliance feasible. A better solution would be a less expensive, passive solution that is applicable to commercial and private transport category aircraft.

BRIEF SUMMARY OF THE INVENTION

An apparatus and process method in accordance with the principles of the present invention includes the use of conformed, interrelated blocks of reticulated foam shaped to replicate the inside dimensions of an aircraft fuel tank. The foam is used as a passive means to mitigate ignition in aircraft auxiliary fuel tanks. The present inventive concept advantageously satisfies the aforementioned deficiencies by providing a method of accomplishing ignition mitigation in transport category aircraft fuel tanks using molded polyurethane safety foam in coordinated shapes to fill the fuel tanks. Polyurethane safety foam is a reticulated flexible foam composed of a skeletal matrix of lightweight interconnecting strands. For purposes of this disclosure, this particular material is referred to as "Reticulated Polyurethane Foam" ("RPF").

Other advantages of the inventive concept include slosh attenuation, hydrodynamic ram attenuation, and foreign object debris barrier properties of RPF. As a surge or explosion mitigating agent, RPF attenuates the sloshing of fuel and, in some cases, eliminates the need for structural baffles within a tank. RPF further provides for a "smooth" sine wave motion of the fuel and reduces rapid redistribution of mass.

Hydrodynamic ram effect within a fuel tank or bladder cell is caused when a projectile impacts the exterior structure of the fuel tank. Ram force can be intensified when the tank is penetrated by a high explosive incendiary ("HEI") delayed detonating-type projectile. The matrix-type structure of RPF absorbs a portion of the shock wave as a projectile penetrates a fuel tank. Attenuation of hydrodynamic ram minimizes damage to the fuel tank structure by reducing the overpressure of the shock wave and helps to orient the round to prevent tumbling. The reduction of fuel tank structural damage can effectively reduce fuel discharge through the projectile entrance and exit points.

The foreign object debris barrier capability of RPF materials is an inherent beneficial effect rather than a product specification requirement. The RPF used in this inventive concept is a natural filter, due to its inherent structure resembling a fibrous network. The finer the porosity of a material used as a fuel filter, the greater the entrapment of foreign objects and loose debris. The RFP material entraps loose debris within a fuel tank and minimizes the amount of debris entering an adjacent tank, the tank fuel lines, or the engine fuel system.

Explosion within a fuel tank containing kerosene-type fuels occurs as a result of the existence of flammable mixture in the ullage in combination with an ignition source. Examples of possible ignition sources include incendiary ammunition penetrating the fuel tank, static discharges, lightning strikes, switch refueling, and electrical shorts. Reticulated polyurethane foam (RPF) is in effect a three-dimensional fire screen, which minimizes the possibility of gasoline and kerosene-type (such as jet aircraft fuel) explosions under one or a combination of the following theories: the foam acts as a heat sink, (i.e., it removes energy from the combustion process by absorbing heat); it mechanically interferes with the compression wave that precedes the flame front in an explosion; and, the high surface-to-volume of reticulated polyurethane foam enables the strands to collect or coalesce the droplets of fuel, thus changing the vaporous mixture in the empty space above the fuel level (ullage), in the tank. Coalescing causes the vaporous mixture to become lean, which minimizes possible explosion.

The present inventive concept advantageously allows for greatly increased effectiveness in preventing the hazardous ignition of fuel within aircraft auxiliary tanks (satisfying all three phase requirements of 14 CFR §25.981 compliance), is passive and therefore far less likely to experience a system failure, and available at a cost of implementation far less than that of alternative electronic solutions.

Experience in the aviation industry has shown that any fuel tank can be filled to maximum of about 85% capacity (not including a fuel swell of 12%) with reticulated polyurethane foam blocks, not including any planned voids. The foam blocks should be kept clear of tank components such as the fuel inlets, fuel sensors, float switches, and tank vents.

Other embodiments of an apparatus and method in accordance with the above principles of the inventive concept may include alternative or optional additional aspects. One such aspect would be use of foam of sufficient porosity and ignition mitigation properties composed of a synthetic or naturally occurring material other than polyurethane.

Figure 4:
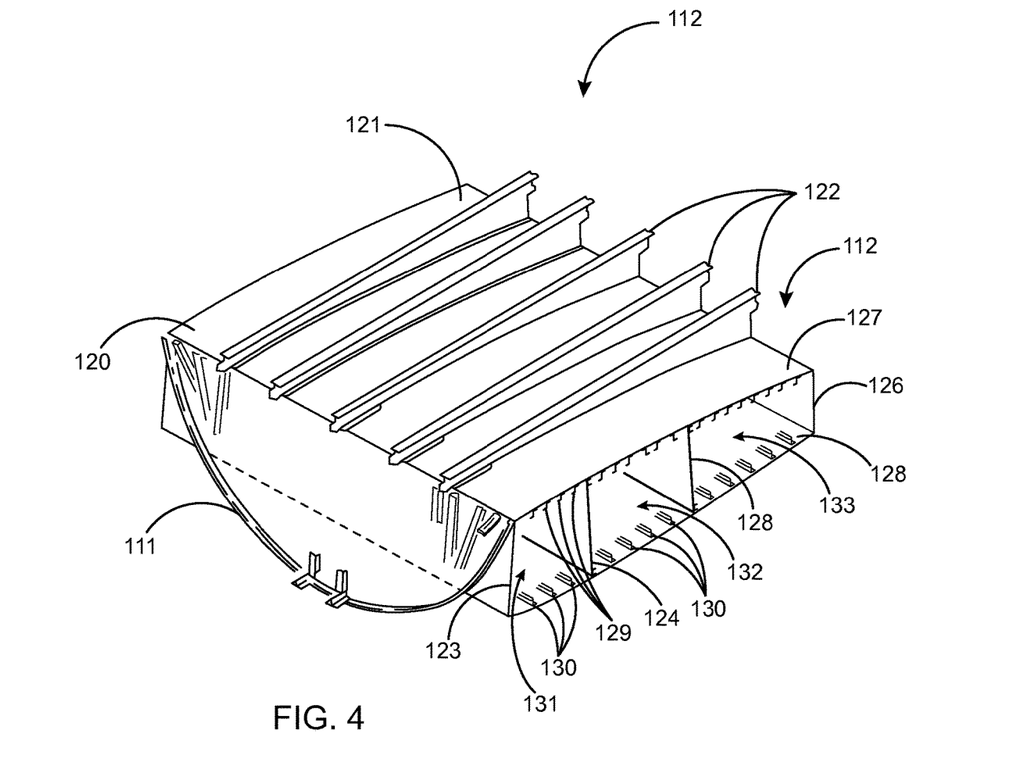
FIG. 4 shows a cutaway view of the structural members of the center wing tank, in accordance with section line 4-4 of FIG. 1.

Another aspect of the present invention is the use of block foam material in an interrelated, geometrical shape different from those shapes depicted in FIG. 4.

Another aspect of the present invention is to use alternate access ports of the aircraft auxiliary fuel tank to insert the foam blocks and position them in a distinct pattern to minimize any voids along tank walls.

Another aspect of the present inventive concept is the utilization of a "fully packed" design concept. A fully packed system is defined as one where all potential fuel tank ullage is filled with reticulated polyurethane foam with cutouts for components only. This system is most desirable where minimal or no tank over-pressure can be tolerated.

Another aspect of the present inventive concept is the utilization of a grossly voided design concept. A grossly voided system is defined as one where the fuel tank contains strategically positioned reticulated foam for explosion suppression. This system provides for minimal weight penalty and fuel retention, and is best suited for a fuel system that can withstand substantial overpressures.

These and various other advantages and features of novelty which characterize the invention are pointed out in the accompanying descriptive matter and drawings which form a further part hereof. For a better understanding of the invention, its advantages and the objects obtained by its use reference should be made to the drawings in which are illustrated and described specific examples of an apparatus and method in accordance with the present invention.

DETAILED DESCRIPTION OF THE INVENTION

The present inventive concept includes the use of shaped, interrelated, sequential blocks of reticulated polyurethane foam (RPF) blocks to fill specific fuel tank(s) of a transport category aircraft. The objects, features, and advantages of the concept presented in this application are more readily understood when referring to the accompanying drawings. The drawings, totaling nine figures, show the basic components and functions of embodiments and/or the proper method steps. In the several figures, like reference numbers are used in each figure to correspond to the same component as may be depicted in other figures.

For illustrative purposes only, and not by way of limitation, the methods and systems described in this disclosure apply primarily to Boeing® 737 series aircraft. This detailed description section is merely exemplary in nature and is not intended to limit the methods and uses shown in this inventive concept. There is no intention for the applicant to be bound or constrained by any expressed or implied theory (ies) set forth in the relevant technical fields, background, brief summary, or the present detailed description of the inventive concept as it relates to Boeing® 737 aircraft. Further, there is no intent to confine the inventive method disclosed to one particular make, model, or series of aircraft, or particular configurations of aircraft fuel tanks.

By utilizing the disclosed method of installing RPF blocks 50 to fill one or more fuel tanks of an aircraft, the aircraft operator prevents or minimizes the potentially damaging or catastrophic effects of fuel ignition, fire, and/or explosion. For ease of explanation and for illustrative purposes, the disclosed method is described with regard to installation of the RPF blocks into the center wing tank 112 of a Boeing® 737 aircraft 110.

Figure 1:
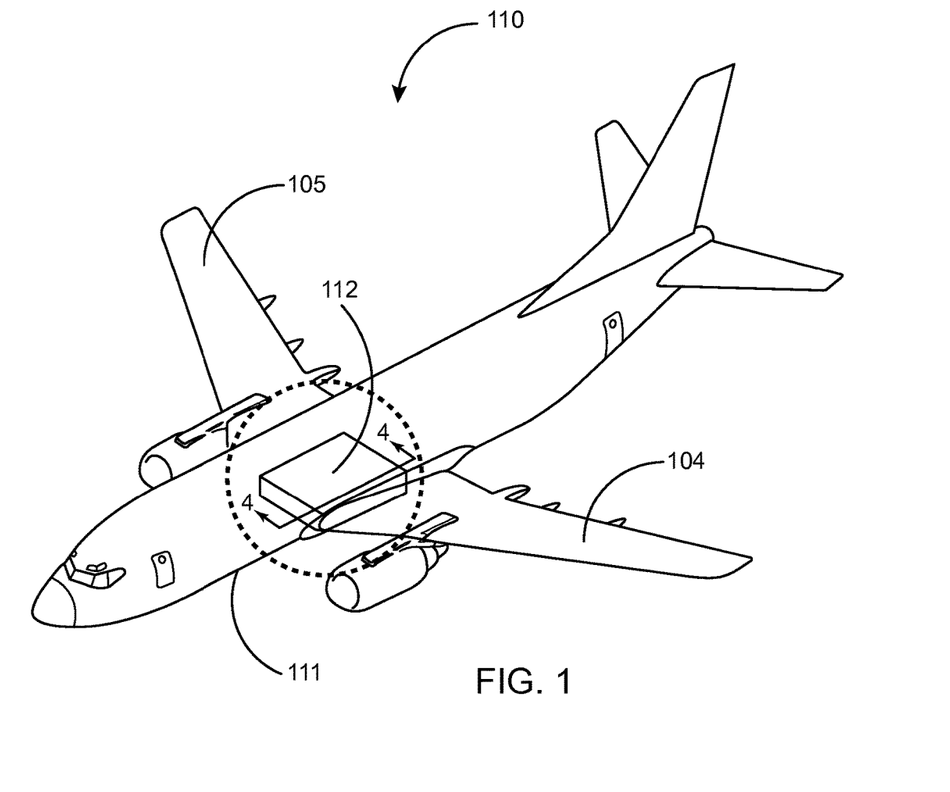
FIG. 1 illustrates a general overall fuselage-cutaway view of a Boeing® 737 jet aircraft, further showing the location of the center wing fuel tank.

The discussion of the present inventive concept will be initiated with FIG. 1, which illustrates an overall view of a Boeing® 737 jet aircraft 110. FIG. 1 also depicts the fuselage 111, and the center wing tank 112, which is encircled. As in most similar jet aircraft, the predominance of the fuel load is generally carried in fuel tanks constructed within the left wing 104 and right wing 105, with equal quantities in each wing 104, 105. The wing-loaded fuel serves to add a counter-balancing weight to offset the upward wing structural bend due to the aerodynamic lift force generated by the wings 104, 105 when in flight. However, for substantially increased range, the aircraft 110 may be loaded with additional fuel in the center wing tank 112 and other internal tanks, if available.

Figure 2:
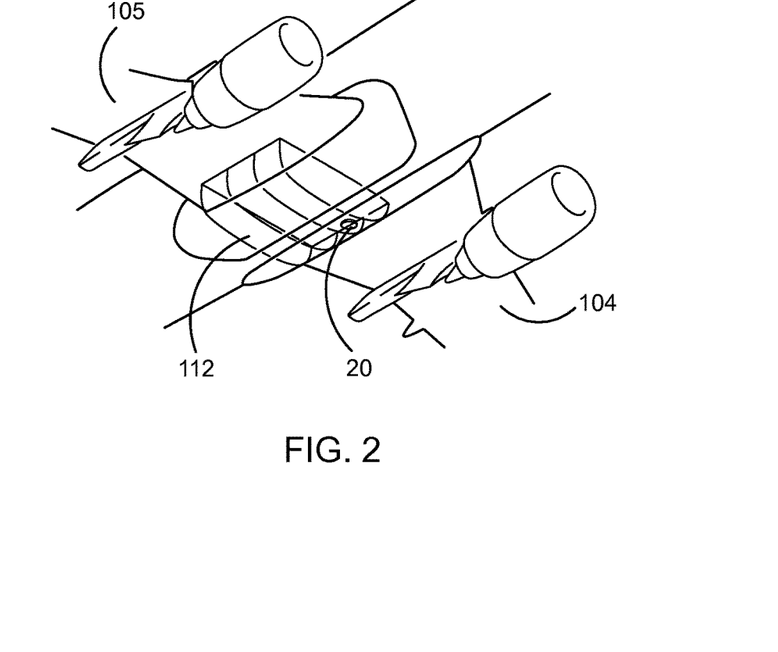
FIG. 2 shows the location of the center wing tank of the Boeing® 737 aircraft, as would be seen looking through the bottom of the fuselage, and further, a tank access panel utilized by maintenance personnel for ground servicing.

FIG. 2 is a stylized rendering looking upward at the undersurface of the Boeing® 737 fuselage 111, further revealing the location of the center wing tank 112. Also shown in FIG. 2 is a center wing tank access panel 20 utilized by maintenance personnel during ground servicing of this particular model and series of the Boeing® 737.

Figures 3, 3A:
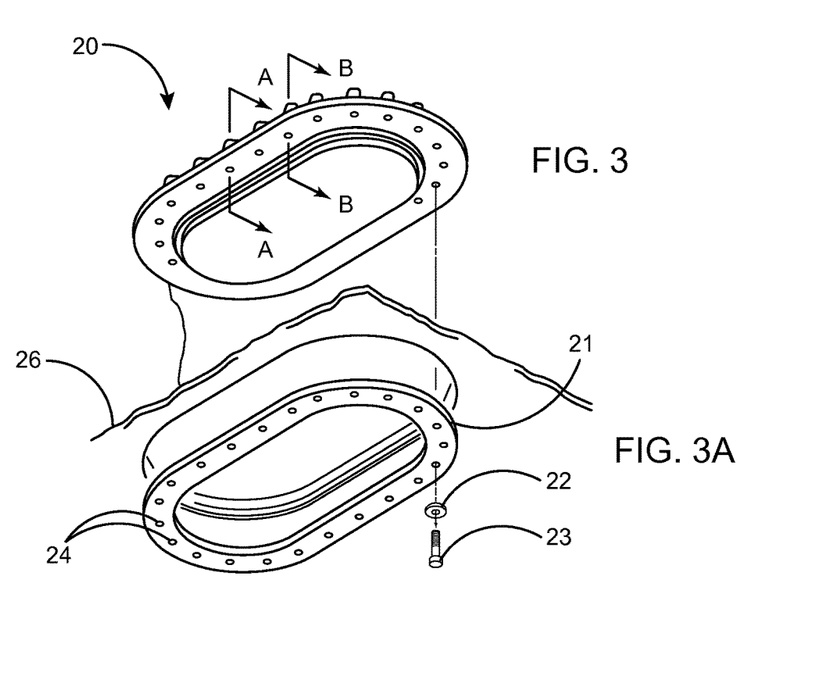
FIG. 3 depicts a close-up view of the access panel to the center wing tank shown in FIG. 2.
FIG. 3(A) is an illustration of the manner in which the access panel is removed from the exterior of the center wing tank

FIG. 3 depicts an expanded view of the access panel 20 shown in FIG. 2. FIG. 3(A) is an illustration of the manner in which the access panel 20 is removed from the exterior of the center wing tank 112, further showing a clamp ring 21, one of a plurality of washers 22, and one of a plurality of bolts 23, the washers 22 and bolts 23 utilized for insertion through apertures 24 for fastening the clamp ring 21 onto a lower center wing panel 26.

FIG. 4 illustrates a stand-alone sectional view of the center wing tank 112, in accordance with section line 4-4 of FIG. 1. The structural integrity of the center wing tank 112, as positioned within the fuselage 111, substantially determines the internal contour of the center wing tank 112. The aircraft 110 structural members shown in FIG. 4 include the front spar 120, the rear spar 121, the floor beams 122, and the tank ceiling 127 abutting the aircraft floor beams 122. As shown in FIG. 4, the center wing tank 112 comprises a forward compartment 131, a center compartment 132, and an aft compartment 133. The three compartments 131, 132, 133 are separated by spanwise beam #2 124 and spanwise beam #1 125. In each of the three compartments 131, 132, 133, the fuel tank floor 128 comprises lower stiffeners 128 and the fuel tank ceiling 127 comprises upper stiffeners 129, which give additional rigidity to the tank compartments 131, 132, 133.

Before continuing with the immediate discussion of installation of the RPF aggregate blocks 50, explanation will be given of the methodology and process of measuring, sizing, and cutting the RPF blocks 50. Shown in FIG. 5 there is illustrated, by way of example, a forward compartment RPF block 51.

Figure 5:
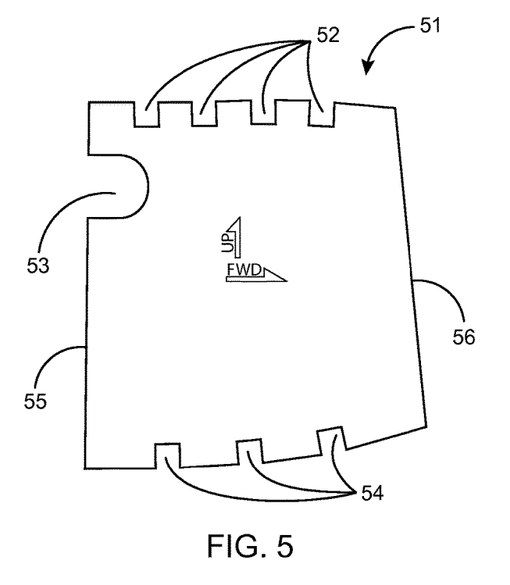
FIG. 5 illustrates the profile of a single, specifically-shaped RPF block which has been precisely cut to fit, in a vertical orientation, the exact contour of one section of the center wing tank.

FIG. 5 shows a profile view of a forward compartment RPF block 51. This forward compartment RPF block 51 is designated as such due to the fact that the contour of its outer perimeter corresponds to the location of a specific, vertically-oriented cross-section of the forward compartment 131 of the center wing tank 112. In examining FIG. 5, the topmost section shows four upper cutouts 52 which provide clearance for the upper stiffeners 129 of the forward compartment 131 as shown in FIG. 4. The left edge 55 of RPF block 51 is fabricated so as to correspond to the forward tank wall 123, and further shows an arcuate cutout 53 which provides clearance for a tank fuel pump, or other tank component. The bottommost section of the forward compartment RPF block 51 illustrates three cutouts 54 which allow clearance for the three lower stiffeners 130 of the forward compartment 131, as shown in FIG. 4.

Figure 5A:
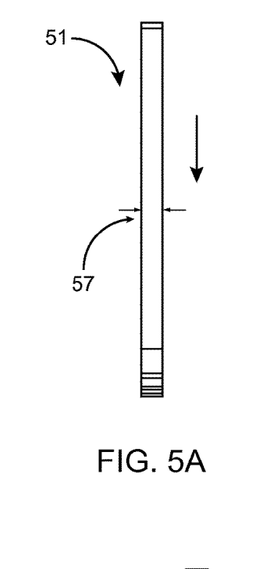
FIG. 5(A) presents a side view of the RPF block of FIG. 5.

The right edge 56 of the forward compartment RPF block 51 corresponds to spanwise beam #2 124, as is depicted in FIG. 4. FIG. 5(A) is a view looking directly at the right edge 56 of the forward compartment RPF block 51, and further showing the nominal width 57 of the forward compartment RPF block 51. The width of the aggregate RPF blocks 50 are fabricated in the range of 2.0 inches to 4.0 inches, depending on the size and contour of the fuel tank in which RPF blocks 50 are to be installed. A directional UP arrow and a FORWARD arrow are printed on the surface of the RPF block 51 to further ensure the installer places the block 51 in the correct orientation.

The illustrated forward compartment RPF block 51 of FIG. 5 is further given a part number (P/N) to indicate its exact location in the forward compartment 131 of the center wing tank 112. The part number also defines the order of its loading in the installation sequence of all RPF blocks 50. The general manner of construction of the contour of the previously-described forward compartment RPF block 51 is typical of the parameters to be met for each of the aggregate RPF blocks 50 to be inserted in the forward compartment 131 of the center wing tank 112 of a Boeing® 737 series 400 aircraft as well as those RPF blocks to be installed in the mid compartment and aft compartment of the center wing tank 112. Similarly, the general manner of construction of the contour of any other RPF block described above is typical of the parameters to be met for any RPF block to be installed in any of a variety of aircraft fuel tanks.

The contours of the aggregate of all RPF blocks 50 are a culmination of determinations made of the internal dimensions, profile, connections, attachments, and integral components of the inner surface of the fuel tank at the specific measured increment along one length of the forward, center, and aft compartments 131, 132, 133 of the center wing tank 112. This methodology is applicable to the determination of the size and contour of any RPF block that may be fabricated for insertion into any of an unlimited variety of aircraft fuel tanks.

In preparing for installation of RPF blocks in the center wing tank 112, a plurality of planar sheets of reticulated polyurethane foam (RPF) material is manufactured. Each of said sheets, in the preferred embodiment, generally comprises a thickness 57 of 2.0 inches. However, in general applicability, the thickness is dependent upon the size and type of aircraft fuel tank in which the RPF blocks are to be inserted. During the manufacturing process, the planar sheets of reticulated polyurethane foam may be dyed a purple color. The purple color facilitates the trouble-shooting of fuel contamination or irregularities associated with the engine fuel feed or tank.

By way of example only, in the case of the center wing tank 112 of a −300 series Boeing® 737 aircraft, engineering drawings are executed in a sequential series of scaled renderings of the profile of the forward compartment 131 of the center wing tank 112. The profile of the compartment is measured and scaled at regularly-spaced increments (2.0 inches in the preferred embodiment) along an essentially horizontal line extending from the right side to the left side of the interior of the forward compartment 131. In the same manner, engineering drawings are rendered for the incremental profile of the center compartment 132 and aft compartment 133 of the center wing tank 112.

A plurality of cutouts of RPF blocks 50 is made from the manufactured sheets of RPF, each block cutout excised according to the previously-described scaled renderings and further, each RPF block cutout is progressively identified with a part number and an orientating UP arrow and FORWARD arrow is printed thereon. Cutting and shaping of the individual RPF block cutouts from the RPF sheets is accomplished by use of several optional means: a mechanical blade type cutting, specially designated/manufactured smooth blade type cutting tools, an extremely fine-toothed band saw-type blade, or a hot-wire type cutting tool per SAE AIR4170A.

Once the entirety of the aggregate RPF blocks 50 required for the center wing tank 112 have been excised, each cutout is painted with a part number (P/N) and numerical sequencing corresponding to the sequential placement of each RPF block cutout along the line of measured increments within each of the forward, center, or aft compartments 131, 132, 133. The RPF blocks 50 are individually packaged and arranged in a stack or stacks which correspond to the orderly, sequential installation of each RPF block 50 along the horizontal line of increments previously measured. Further, detailed written instructions regarding the installation are drafted and organized in a manual for the guidance of technicians who will install said RPF blocks 50.

To install the shaped block reticulated polyurethane foam in the center wing tank 112, the aircraft 110 must be positioned on a level surface and at a convenient height for access to the center wing tank 112. The access opening cover is then removed and the RPF blocks 50 are inserted through the access openings with the exercise of care to avoid tearing or abrading the RPF blocks on the lip of the opening. FIG. 2, FIG. 3 and FIG. 3(A) illustrate the relative position of the access panel 20 of the center wing tank 112.

As stated previously, a very specific order of insertion of the RPF blocks 50 must be followed so that all spaces that are intended to be filled in the center wing tank 112 are indeed filled. Empty spaces in the tank can only be those left by design, which is referred to as "planned voiding." The center wing tank 112 under discussion here should be filled with the RPF blocks 50 fitted according to the patterns specified in the specific engineering drawings and installation instructions of each designed block contour.

Figure 6:
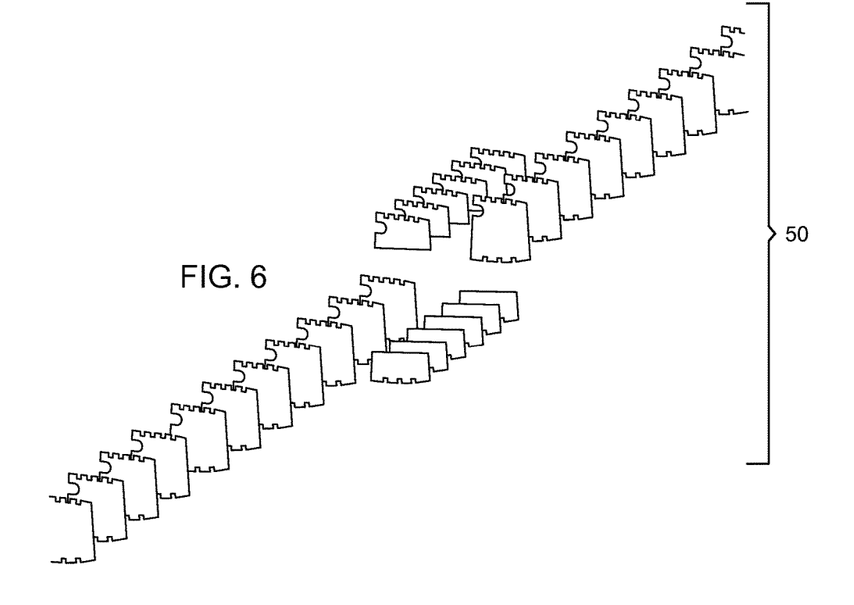
FIG. 6 presents a diagram of the aggregate of a plurality of sequentially-arranged, pre-cut RPF blocks to be installed adjacent to one another, thereby conforming to the contour of the forward compartment of the center wing tank.
Figure 7:
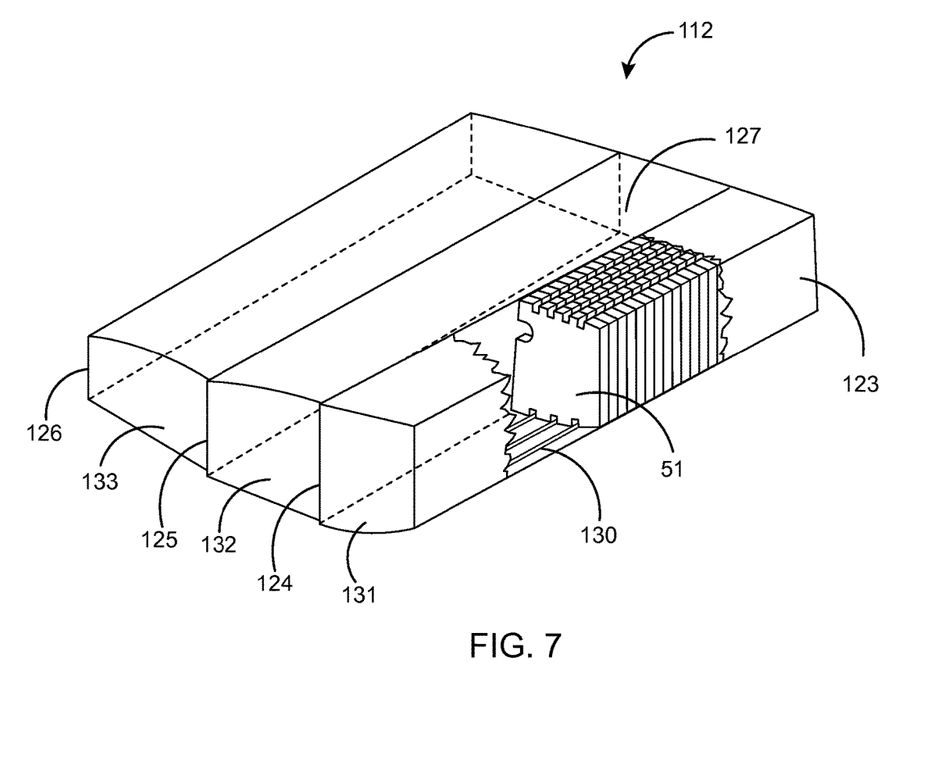
FIG. 7 is a stylized rendering of the center wing tank, further showing the packing arrangement of a plurality of RPF blocks properly installed in the forward compartment of the center wing tank.

By way of further illustration, FIG. 6 depicts a diagram of a plurality of sequentially-arranged, pre-cut RPF blocks to be installed adjacent to one another, thereby conforming to the interior contour of the forward compartment 131 of the center wing tank 112 of a Boeing® 737 aircraft. Each of the RPF blocks 50 has a shape and an order of installation which ultimately conforms to a specific contour of the forward compartment 131 at a precise point in the forward compartment 131. FIG. 7 is a stylized rendering of the center wing tank 112, further showing the packing arrangement of a plurality of RPF blocks 50 in the process of being installed in the forward compartment 131 of the center wing tank 112.

Generally, the installation of the RPF blocks 50 is accomplished by technicians entering through existing fuel tank access bays and openings, along with the uploading of the RPF blocks 50 into the tank 112. In the preferred embodiment, as disclosed in this inventive concept, and for illustrative purposes only, the center wing tank 112 of a typical Boeing® 737 aircraft is depicted as undergoing installation of the RPF blocks. On aircraft other than the Boeing® 737, existing fuel tank access openings that may be used for insertion and installation include, but are not limited to, maintenance access holes, wet and dry access bays found on non-cylindrical auxiliary fuel tanks, inspection holes in belly tanks, and the like. A very specific order of insertion of the RPF blocks 50 must be followed so that all spaces that are intended to be filled in the tank are indeed filled.

The shaped blocks 50 of reticulated polyurethane foam (RPF) are inserted through one or more of the access bays, ports, etc., and fitted together in accordance with the present invention. Care is necessarily exercised to avoid tearing or abrading the foam on the lip of the access bays. Shaped block foam pieces are inserted and positioned in a manner to ensure that the required internal tank void is filled and maximum ignition source prevention is achieved. The foam material used is considered to be a "memory foam" type, the kind that returns to its original shape after compression down to 40% of its original volume. These "memory foam" RPF blocks 50 may be compressed for passage through the access ports. A key feature of the present inventive concept is that the design of the shaped block foam pieces to allow them to fit through the existing access bays or ports of various aircraft fuel tanks. Previously, installation of similar material had to be accomplished by removing some portions of the aircraft wing skin in some areas.

The majority of Boeing® 737 series 300 and series 400 aircraft are characterized by a first internal access port 18 between the aft compartment 133 and the center compartment 132 of the aircraft and a second internal access port 19 between the center compartment 132 and the forward compartment 131. These access ports are depicted in FIGS. 8, 8A, 8B, and 8C. In the installation of RPF blocks 50 in the center wing tank 112 of a Boeing® 737 aircraft, the procedure begins with the right side of the aft compartment 133 of the center wing tank 112. The installer(s) must gain access to the aft compartment 133 first, through the lower access panel 20 located on the underside of the fuselage 111 of the aircraft, as shown in FIG. 2 and FIG. 3. Access is sequentially accomplished through the second internal access port 19, and the first internal access port 18.

Figure 8:
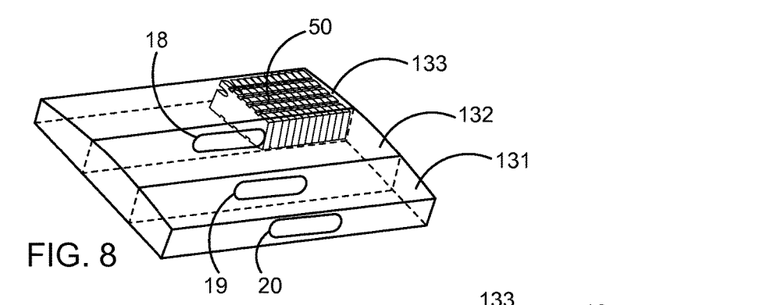
FIG. 8 depicts the initiation of installation of RPF blocks on the right side of the aft compartment.
Figure 8A:
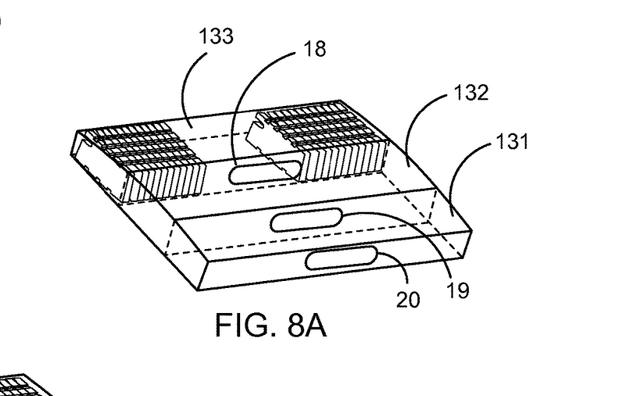
FIG. 8A shows the initiation of installation of RPF blocks on the left side of the aft compartment, the right side of the compartment having been completed
Figure 8B:
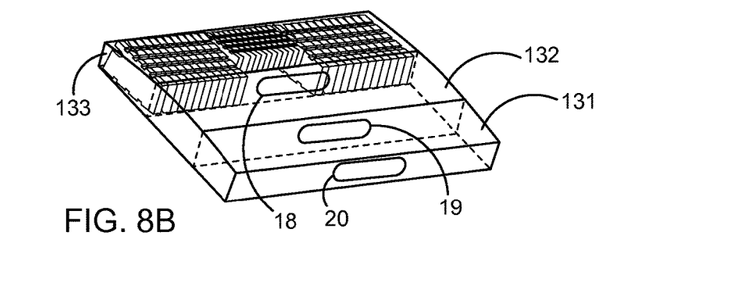
FIG. 8B presents depicts the beginning of installation of RPF blocks in the middle section of the aft compartment.
Figure 8C:
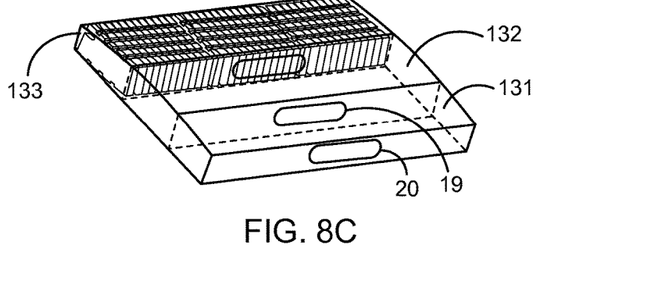
FIG. 8C depicts the completion of installation of RPF blocks in the aft compartment.

FIG. 8 depicts a quantity of RPF blocks 50 having been installed on the right side of the aft compartment 133. Next, the installer(s) work the left side of the aft compartment 133. FIG. 8A showing the completion of installation of RPF blocks on the left side of the aft compartment 133, the right side of the compartment 133 having been completed. As the installer(s) begins exiting the aft compartment 133 through the first access port 18, he/she installs RPF blocks 50 in the middle section of the aft compartment 133, as shown in FIG. 8B, FIG. 8C depicts the completion of installation of RPF blocks 50 in the aft compartment 133.

Figure 9:
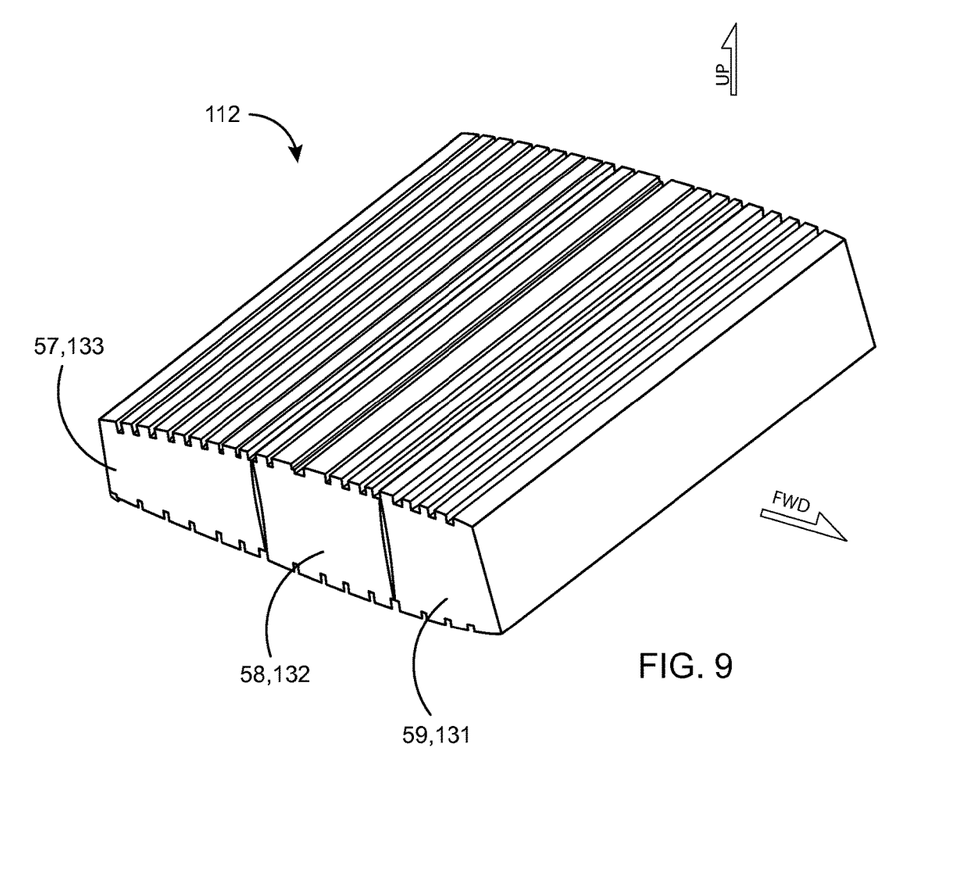
FIG. 9 illustrates a diagram of the resultant installation of all RPF blocks in the forward, center, and aft compartments of the center wing tank of a typical Boeing® 737 aircraft.

FIG. 9 illustrates a diagram of the resultant installation of all RPF blocks in the forward, mid, and aft compartments of the center wing tank 112 of a typical Boeing® 737 aircraft. The diagram depicts the aft compartment 133, the mid The fitted size, shape and installation of the aggregate of RPF blocks 50 should be such that no internal tank voids longer than 2.5 feet exist (with the internal tank fuel probes installed). The RPF blocks 50 must be kept clear of the tank components such as the fuel ports, fuel probes, float switches, and tank vents. The "planned" voiding areas around these structures should not exceed a volume of 10% of the total fuel tank volume and there should be no connecting voids between any of the planned void spaces. The minimum space of foam filled area required between the planned void areas is three (3.0) inches if maximum void size is used.

While the present invention has been described above in terms of specific embodiments, it is understood that the invention is not limited to these disclosed embodiments. It is not intended to be exhaustive or to limit the invention to the precise form disclosed. Many modifications, variations, and other embodiments of the invention will come to mind of those skilled in the art to which this invention pertains, and which are intended to be and are covered by both this disclosure and hereafter submitted claims. It is indeed intended that the scope of the invention should be determined by proper interpretation and construction of the hereafter submitted claims and their legal equivalents, as understood by those of skill in the art relying upon the disclosure in this specification and the attached drawings. It is intended that the scope of the invention is not limited to any particular aircraft.

What is claimed is:

1. In an aircraft equipped with at least one liquid fuel tank, the tank having internal surfaces contoured for the accommodation of structural members such as spars, beams, valves, and piping, a method for providing fuel ignition mitigation in the tank, comprising the steps of:
   a) determining dimensions, contour, and precise locations of structural members of the fuel tank as encountered at sequentially-measured linear increments along either width or length dimension of the tank interior;
   b) rendering a scaled engineering drawing of a vertically-oriented cross-sectional profile of the fuel tank at each linear increment;
   c) numerically sequencing each drawing so as to correspond to a respective drawing location along the liner increments within the tank;
   d) providing a plurality of planar sheets of reticulated polyurethane foam (RPF) material, said RPF comprising a thickness dependent upon size and type of aircraft fuel tank;
   e) excising an aggregate of cutouts of RPF blocks from said planar sheets of RPF, each cutout conforming to each of the scaled engineering drawings, and further, designating each cutout by a part number, an orientating "UP" arrow, and an orientating "FORWARD" arrow;
   f) arranging the aggregate of said RPF blocks in a progressive sequence corresponding to the sequence of each RPF cutout part number;
   g) sequentially packaging said aggregate of RPF blocks into groupings containing a specified number of RPF blocks per grouping;
   h) composing instructions to be used by technicians/installers for the purpose of inserting and installing said RPF blocks into the tank;
   i) parking the aircraft on a level surface, and emptying and purging the tank;
   j) removing a fuel tank access panel or other external fuel tank cover which i) functions as a point of entry for maintenance personnel and/or technicians into the fuel tank, and ii) is proximate a pre-determined starting point of the installation;
   k) inspecting the internal surfaces of the tank to ensure cleanliness and accessibility by the installers;
   l) placing the first sequential RPF block at a specified location within the fuel tank as so designated in the instructions;
   m) placing each successively-ordered RPF block at its designated location within the fuel tank, as set forth in the instructions, until said fuel tank is filled in accordance with the previously determined aggregate of RPF blocks;
   n) performing an inspection of the installed RPF blocks, and afterwards, closing any previously opened fuel tank access panel; and o) re-fueling the fuel tank and verifying the fuel tank's maximum fuel quantity in accordance with FAA-certified fuel gauge calibrating procedures for the aircraft.

2. In an aircraft equipped with at least one fuel tank consisting of multiple compartments, each compartment having interior surfaces contoured for the accommodation of compartment structural members, and equipment a method for providing fuel ignition mitigation within each individual compartment, comprising the steps of:
  a) determining dimensions, contour, and precise location of structural members for each compartment as encountered at sequentially-measured linear increments along either width or length dimension of the compartment interior;
  b) rendering a scaled engineering drawing of a vertically-oriented cross-sectional profile at each measured linear increment in each compartment;
  c) numerically sequencing each drawing corresponding to a respective drawing location along the measured linear increment within its respective compartment;
  d) providing a plurality of planar sheets of reticulated polyurethane foam (RPF) material, said RPF material comprising a thickness in-dependent upon size and type of aircraft fuel tank;
  e) excising an aggregate of cutouts of RPF blocks from said planar sheets of RPF, each cutout conforming to each of the scaled engineering drawings for each particular compartment, and further, designating each RPF block by a part number, an orientating "UP" arrow, and an orientating "FORWARD" arrow;
  f) for each compartment, arranging the aggregate of said RPF blocks in a progressive sequence corresponding to the sequence of the cutout part number of each RPF block;
  g) for each compartment, sequentially packaging said aggregate of RPF blocks into groupings containing a specified number of RPF blocks per grouping;
  h) composing instructions for each compartment, to be used by technicians and/or installers for the purpose of inserting the RPF blocks into the compartment;
  i) parking the aircraft on a level surface and emptying and purging all compartments of the fuel tank;
  j) commencing installation in a selected compartment by removing a fuel tank access panel or other external tank cover which i) functions as an opening for entry of maintenance personnel and/or technicians into the compartment, and ii) is proximate the selected compartment;
  k) inspecting the interior surfaces of the selected compartment to ensure cleanliness and accessibility by the installers;
  l) placing the first sequential RPF block at a specified location within the selected compartment as so designated in the instructions;
  m) placing each successively-ordered RPF block at its designated location within the compartment as set forth in the instructions, until the compartment is filled in accordance with the instructions;
  n) for each remaining compartment of the fuel tank, performing steps j) through m), above;
  o) performing an inspection of the installed RPF blocks, and afterwards, closing all open compartment or fuel tank access panels;
  p) re-fueling all compartments of the fuel tank and verifying the fuel tank's maximum fuel quantity in accordance with FAA-certified fuel gauge calibrating procedures for the subject aircraft.

3. A method for providing fuel ignition mitigation for the interior of the center wing tank of an aircraft of the type having a center wing tank consisting of a forward, center, and aft compartment, in which each compartment manifests interior surfaces contoured for the accommodation of compartment structural members and equipment, said method comprising the steps of:
  a) determining dimensions, contour, and precise location of structural members for each of the compartments as encountered at sequentially-measured linear increments along either width or length dimension of the interior of each compartment;
  b) rendering scaled engineering drawing of a vertically-oriented cross-sectional profile of each of the forward, center, and aft compartments at each measured linear increment;
  c) numerically sequencing each drawing corresponding to a respective drawing location along the measured linear increments within the respective forward, center and aft compartment;
  d) providing a plurality of planar sheets of reticulated polyurethane foam (RPF) material, said sheets of RPF comprising a thickness dependent upon size and type of aircraft fuel tank;
  e) excising an aggregate of cutouts of RPF blocks from said planar sheets of RPF, each block cutout conforming to the scaled engineering drawing for each particular compartment, and further, designating each RPF block by a part number, an orientating "UP" arrow and an orientating "FORWARD" arrow;
  f) arranging the aggregate of said RPF blocks in a progressive sequence corresponding to the sequence of each RPF cutout part number for each of the forward, center, and aft compartments;
  g) for each compartment, sequentially packaging an aggregate of RPF blocks into groupings containing a specified number of RPF blocks per grouping;
  h) composing instructions for each compartment to be used by technicians/installers for the purpose of inserting and installing said RPF blocks into each compartment;
  i) parking the aircraft on a level surface, and emptying and purging all compartments of the center wing tank;
  j) beginning with the aft compartment, removing a tank access panel or other external tank cover which i) functions as an opening for entry of maintenance personnel and/or technicians into the aft compartment, and ii) is proximate the aft compartment;
  k) inspecting the interior surfaces of the aft compartment to ensure cleanliness and accessibility by persons;
  l) placing the first sequential RPF block at a specified location within the aft compartment, as so designated in the instructions;
  m) placing each successively-ordered RPF block at its designated location within the aft compartment as set forth in the installation instructions, until said aft compartment is filled in accordance with the previously determined aggregate of RPF blocks;
  n) performing an inspection of the installed RPF blocks in the aft compartment, then closing any previously opened tank/compartment access panels,
  o) placing successively-ordered RPF blocks at their designated locations within the center compartment as set forth in steps j) through n), above until said center compartment is filled with the required aggregate of RPF blocks;

p) placing successively-ordered RPF block at their designated locations within the forward compartment as set forth in steps j) through n) above, until said forward compartment is filled with the required aggregate of RPF blocks; and q) re-fueling all compartments of the center wing tank and verifying the tank's maximum fuel quantity in accordance with FAA-certified fuel gauge calibrating procedures for the aircraft.

4. The method as in claim 1, wherein the reticulated polyurethane foam material comprises a purple color.

5. The method as in claim 2, wherein the reticulated polyurethane foam material comprises a purple color.

6. The method as in claim 3, wherein the reticulated polyurethane foam material comprises a purple color.

* * * * *